(12) United States Patent
Ding et al.

(10) Patent No.: US 10,949,438 B2
(45) Date of Patent: Mar. 16, 2021

(54) DATABASE QUERY FOR HISTOGRAMS

(71) Applicant: Microsoft Technology Licensing, LLC, Redmond, WA (US)

(72) Inventors: Bolin Ding, Redmond, WA (US); Chi Wang, Redmond, WA (US); Danyel A. Fisher, Seattle, WA (US); Robyn Dominik Moritz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 881 days.

(21) Appl. No.: 15/453,743

(22) Filed: Mar. 8, 2017

(65) Prior Publication Data
US 2018/0260451 A1 Sep. 13, 2018

(51) Int. Cl.
*G06F 16/248* (2019.01)
*G06F 16/2458* (2019.01)

(52) U.S. Cl.
CPC ........ *G06F 16/248* (2019.01); *G06F 16/2462* (2019.01)

(58) Field of Classification Search
CPC ..... G06K 9/6212; G06F 16/248; G06F 16/26; G06F 16/00; G06F 16/9038; G06F 16/3328; G06F 17/18; G06F 16/2462; A61B 5/7257; G01N 21/31
See application file for complete search history.

(56) References Cited

U.S. PATENT DOCUMENTS

| | | | |
|---|---|---|---|
| 5,870,752 A | 2/1999 | Gibbons et al. | |
| 6,460,045 B1 | 10/2002 | Aboulnaga et al. | |
| 6,507,840 B1 | 1/2003 | Ioannidis et al. | |
| 6,549,910 B1 * | 4/2003 | Tate | G06F 16/2462 707/E17.079 |
| 6,691,099 B1 * | 2/2004 | Mozes | G06F 16/2462 707/999.004 |

(Continued)

OTHER PUBLICATIONS

Grupcev, et al., "Approximate Algorithms for Computing Spatial Distance Histograms with Accuracy Guarantees", In Journal of IEEE Transactions on Knowledge and Data Engineering, vol. 25, Issue 9, Sep. 2013, pp. 1-16.

(Continued)

*Primary Examiner* — Yuk Ting Choi
(74) *Attorney, Agent, or Firm* — Schwegman Lundberg & Woessner, P.A.

(57) ABSTRACT

Methods, systems, and computer programs are presented for obtaining histogram data from a database utilizing an interface with histogram-related options. One method includes an operation for providing, by a server, an application programming interface (API), to access the database, which includes a histogram request, to obtain histogram data from the database, with histogram options. The server receives, from a client device, a first histogram request including histogram options. Additionally, the method includes an operation for identifying bins for the histogram based on the one or more histogram options. For each bin, the server accesses the database to obtain data for each bin. The server returns, to the client device, the histogram data for the histogram as a table containing bin values for all the bins, where the client device is configured to present the histogram to a user based on the histogram data.

16 Claims, 11 Drawing Sheets

(56) References Cited

U.S. PATENT DOCUMENTS

| | | |
|---|---|---|
| 6,714,938 B1 | 3/2004 | Avadhanam et al. |
| 6,859,804 B2 | 2/2005 | Kamath et al. |
| 6,865,567 B1 | 3/2005 | Oommen et al. |
| 7,401,073 B2 | 7/2008 | Carmel et al. |
| 7,707,005 B2 | 4/2010 | Fraser et al. |
| 8,145,669 B2 | 3/2012 | Cormode et al. |
| 8,229,917 B1 | 7/2012 | Aneas et al. |
| 9,189,520 B2 | 11/2015 | May et al. |
| 9,361,339 B2 | 6/2016 | DeHaan |
| 9,390,170 B2 | 7/2016 | Wang et al. |
| 2006/0230083 A1* | 10/2006 | Allyn ............... G06F 11/3684 707/999.204 |
| 2008/0192821 A1* | 8/2008 | Malayath ............ H04N 19/124 375/240.03 |
| 2010/0030518 A1* | 2/2010 | Weber .................... G06F 17/18 702/180 |
| 2011/0093477 A1* | 4/2011 | Aldridge ................ G06F 17/18 707/752 |
| 2014/0058763 A1* | 2/2014 | Zizzamia .............. G06Q 50/22 705/4 |
| 2015/0269228 A1 | 9/2015 | Fisher et al. |
| 2016/0210329 A1 | 7/2016 | Bortoletto et al. |

OTHER PUBLICATIONS

Agarwal, et al., "Knowing when you're Wrong: Building Fast and Reliable Approximate Query Processing Systems", In Proceedings of the ACM SIGMOD International Conference on Management of Data, Jun. 22, 2014, pp. 481-492.

Agarwal, et al., "BlinkDB: Queries with Bounded Errors and Bounded Response Times on Very Large Data", In Proceedings of the 8th ACM European Conference on Computer Systems, Apr. 15, 2013, pp. 29-42.

Bostock, et al., "D3 Data-Driven Documents", In Proceedings of IEEE Transactions on Visualization and Computer Graphics, vol. 17, Issue 12, Dec. 2011, 9 pages.

Budiu, et al., "Interacting with large distributed datasets using Sketch", In Proceedings of Eurographics Symposium on Parallel Graphics and Visualization, May 25, 2015, 13 pages.

Card, et al., "The information visualizer, an information workspace", In Proceedings of the SIGCHI Conference on Human Factors in Computing Systems, Apr. 27, 1991, 181-188 pages.

Chaudhuri, et al., "An Overview of Data Warehousing and OLAP Technology", In Journal of ACM SIGMOD Record, vol. 26, Issue 1, Mar. 1997, 10 pages.

Cumming, et al., "Inference by Eye: Confidence Intervals and How to Read Pictures of Data", In Journal of American Psychologist, vol. 60, No. 2, Feb. 2005, pp. 170-180.

Ding, et al., "Sample + Seek: Approximating Aggregates with Distribution Precision Guarantee", In Proceedings of the International Conference on Management of Data, Jun. 26, 2016, pp. 679-694.

Elmqvist, et al., "Hierarchical Aggregation for Information Visualization: Overview, Techniques, and Design Guidelines", In Journal of IEEE Transactions on Visualization and Computer Graphics, vol. 16, Issue 3, May 2010, pp. 439-454.

Fekete, et al., "Progressive Analytics: A Computation Paradigm for Exploratory Data Analysis", In Proceedings of Computer Research Repository, Jul. 2016, 10 pages.

Ferreira, et al., "Sample-oriented task-driven visualizations: Allowing users to make better, more confident decisions", In Proceedings of the SIGCHI Conference on Human Factors in Computing Systems, Apr. 26, 2014, pp. 571-580.

Fisher, Danyel, "Big Data Exploration Requires Collaboration between Visualization and Data Infrastructures", In Proceedings of the Workshop on Human-In-the-Loop Data Analytics, Jun. 26, 2016, 5 pages.

Fisher, et al., "Trust me, I'm partially right: incremental visualization lets analysts explore large datasets faster", In Proceedings of the SIGCHI Conference on Human Factors in Computing Systems, May 5, 2012, pp. 1673-1682.

Godfrey, et al., "Interactive Visualization of Large Data Sets", In Proceedings of IEEE Transactions on Knowledge and Data Engineering, vol. 28, No. 8, Aug. 2016, pp. 2142-2157.

Gray, et al., "Data cube: A relational aggregation operator generalizing group-by, cross-tab, and sub-totals", In Journal of Data Mining and Knowledge Discovery, vol. 1, Issue 1, Mar. 1997, 5 pages.

Heer, et al., "Graphical histories for visualization: Supporting analysis, communication, and evaluation", In IEEE transactions on visualization and computer graphics, vol. 14, Issue 6, Nov. 2008, pp. 1189-1196.

Hellerstein, et al., "Interactive Data Analysis: The Control Project", In Journal of Computer, vol. 32, Issue 8, Aug. 1999, pp. 51-59.

Hellerstein, et al., "Online aggregation", In Proceedings of the ACM SIGMOD Record, vol. 26, Issue 2, Jun. 1997, pp. 171-182.

Hullman, et al., "Hypothetical Outcome Plots Outperform Error Bars and Violin Plots for Inferences about Reliability of Variable Ordering", In PloS one, vol. 10, Issue 11, Nov. 16, 2015, 36 pages.

Joslyn, et al., "Decisions with uncertainty: the glass half full", In Journal of Current Directions in Psychological Science, vol. 22, Issue 4, Aug. 1, 2013, 3 pages.

Kamat, et al., "Distributed and interactive cube exploration", In Proceedings of IEEE 30th International Conference on Data Engineering, Mar. 31, 2014, 12 pages.

Lins, et al., "Nanocubes for real-time exploration of spatiotemporal datasets", In IEEE Transactions on Visualization and Computer Graphics, vol. 19, Issue 12, Dec. 2013, 10 pages.

Liu, et al., "The effects of interactive latency on exploratory visual analysis", In IEEE transactions on visualization and computer graphics, vol. 20, Issue 12, Dec. 2014, 10 pages.

Liu, et al., "imMens: Real-time Visual Querying of Big Data", In Publication of Wiley Online Library, Jun. 1, 2013, 4 pages.

Jerzy Neyman, "Outline of a theory of statistical estimation based on the classical theory of probability", In Publication of Royal Society, Aug. 30, 1937, 48 pages.

Nielsen, Jakob, "Response times: The 3 important limits", In Book of Usability Engineering, Jan. 1, 1993, 7 pages.

North, Chris, "Toward measuring visualization insight", In Journal of IEEE Computer Graphics and Applications, vol. 26, Issue 3, May 1, 2006, pp. 20-23.

"Airline Delays, Cancellations and Tarmac Times", http://www.rita.dot.gov/bts/data_and_statistics/by_mode/airline_and_airpods/airline_delay.html, Retrieved on: Dec. 15, 2016, 2 pages.

Olken, et al., "Simple Random Sampling from Relational Databases", In Proceedings of the Twelfth International Conference on Very Large Data Bases, Aug. 1986, pp. 160-169.

Olston, et al., "Visualizing data with bounded uncertainty", In Proceedings of the IEEE Symposium on Information Visualization, Oct. 28, 2002, pp. 1-8.

Perrot, et al., "Large interactive visualization of density functions on big data", In Proceedings of 5th IEEE Symposium on Large Data Analysis and Visualization, Oct. 2015, 9 pages.

Pezzotti, et al., "Approximated and User Steerable tSNE for Progressive Visual Analytics", In Journal of IEEE Transactions on Visualization and Computer Graphics, Dec. 2015, pp. 1-15.

Pirolli, et al., "The sensemaking process and leverage points for analyst technology as identified through cognitive task analysis", In Proceedings of international conference on intelligence analysis, vol. 5, May 2, 2005, 6 pages.

Stasko, et al., "Jigsaw: supporting investigative analysis through interactive visualization", In Journal of Information Visualization, vol. 7, Issue 2, Summer, 2008, pp. 118-132.

Stolper, et al., "Progressive visual analytics: User-driven visual exploration of in-progress analytics", In Journal of IEEE transactions on visualization and computer graphics, vol. 20, Issue 12, Dec. 31, 2014, 10 pages.

Stolte, et al., "Polaris: A system for query, analysis, and visualization of multidimensional relational databases", In Journal of IEEE Transactions on Visualization and Computer Graphics, vol. 8, Issue 1, Jan. 2002, 10 pages.

John W. Tukey, "Exploratory data analysis", In Publication of Pearsonl, Jan. 1977, pp. 5-23.

(56) References Cited

OTHER PUBLICATIONS

Wickham, Hadley, "Bin-summarise-smooth: A framework for visualising large data", In technical Report of Clarkson University, Oct. 13, 2013, 9 pages.

Wongsuphasawat, et al., "Voyager: Exploratory Analysis via Faceted Browsing of Visualization Recommendations", In Journal of IEEE Transactions on Visualization and Computer Graphics, vol. 22, Issue 1, Jan. 2016, 10 pages.

Yi, et al., "Understanding and characterizing insights: how do people gain insights using information visualization?", In Proceedings of the Workshop on beyond time and errors: novel Evaluation methods for Information Visualization, Apr. 5, 2008, pp. 1-6.

"Database SQL Tuning Guide", https://docs.oracle.com/database/121/TGSQL/tgsql_histo.htm, Retrieved on: Dec. 16, 2016, 22 pages.

Wickham, et al., "40 years of boxplots", http://vita.had.co.nz/papers/boxplots.pdf, Published on: Nov. 29, 2011, pp. 1-17.

U.S. Appl. No. 15/192,909, Ding, et al., "Approximating Aggregate Queries with Distribution Precision Guarantee", filed Jun. 24, 2016.

* cited by examiner

HISTOGRAM DATA TABLE

| BIN # | BIN BOUNDARY | COUNT (K) |
|---|---|---|
| 1 | 100 | 23 |
| 2 | 200 | 450 |
| 3 | 300 | 151 |
| 4 | 400 | 21 |
| 5 | 500 | 0 |
| 6 | 600 | 35 |
| 7 | 700 | 0 |
| 8 | 800 | 0 |
| 9 | 900 | 58 |
| 10 | 1000 | 113 |
| 11 | 1100 | 0 |
| 12 | 1200 | 0 |
| 13 | 1300 | 40 |
| 14 | 1400 | 32 |
| 15 | 1500 | 0 |
| 16 | 1600 | 0 |
| 17 | 1700 | 0 |
| 18 | 1800 | 0 |
| 19 | 1900 | 19 |
| 20 | 2000 | 0 |
| 21 | 2100 | 0 |
| 22 | 2200 | 20 |
| ... | ... | ... |

FIG. 6

DATABASE QUERY FOR HISTOGRAMS

TECHNICAL FIELD

The subject matter disclosed herein generally relates to methods, systems, and programs for obtaining data efficiently from a database.

BACKGROUND

Histograms provide an easy way to represent data visually, especially when dealing with large amounts of data (e.g., weather data or statistical data at a national level). Unfortunately, getting data for a histogram is usually an expensive activity. For example, a program executing in a client device must send several requests to the database in order to obtain the desired data. These requests may include obtaining the maximum and minimum values of the data, determining the bins for the histogram, and sending a request for each bin to the data value for the bin.

When the database has a large amount of data, these access operations may be expensive (e.g., utilize a large amount of computer resources). Also, if the user wishes to compare data from a previous histogram (e.g., from the previous year), the user has to make sure that the data (e.g., the bins) are aligned properly in order to be able to visually compare the old and the new histograms.

BRIEF DESCRIPTION OF THE DRAWINGS

Various ones of the appended drawings merely illustrate example embodiments of the present disclosure and cannot be considered as limiting its scope.

FIG. 6 is a histogram data table, according to some example embodiments.

DETAILED DESCRIPTION

Figure 1:
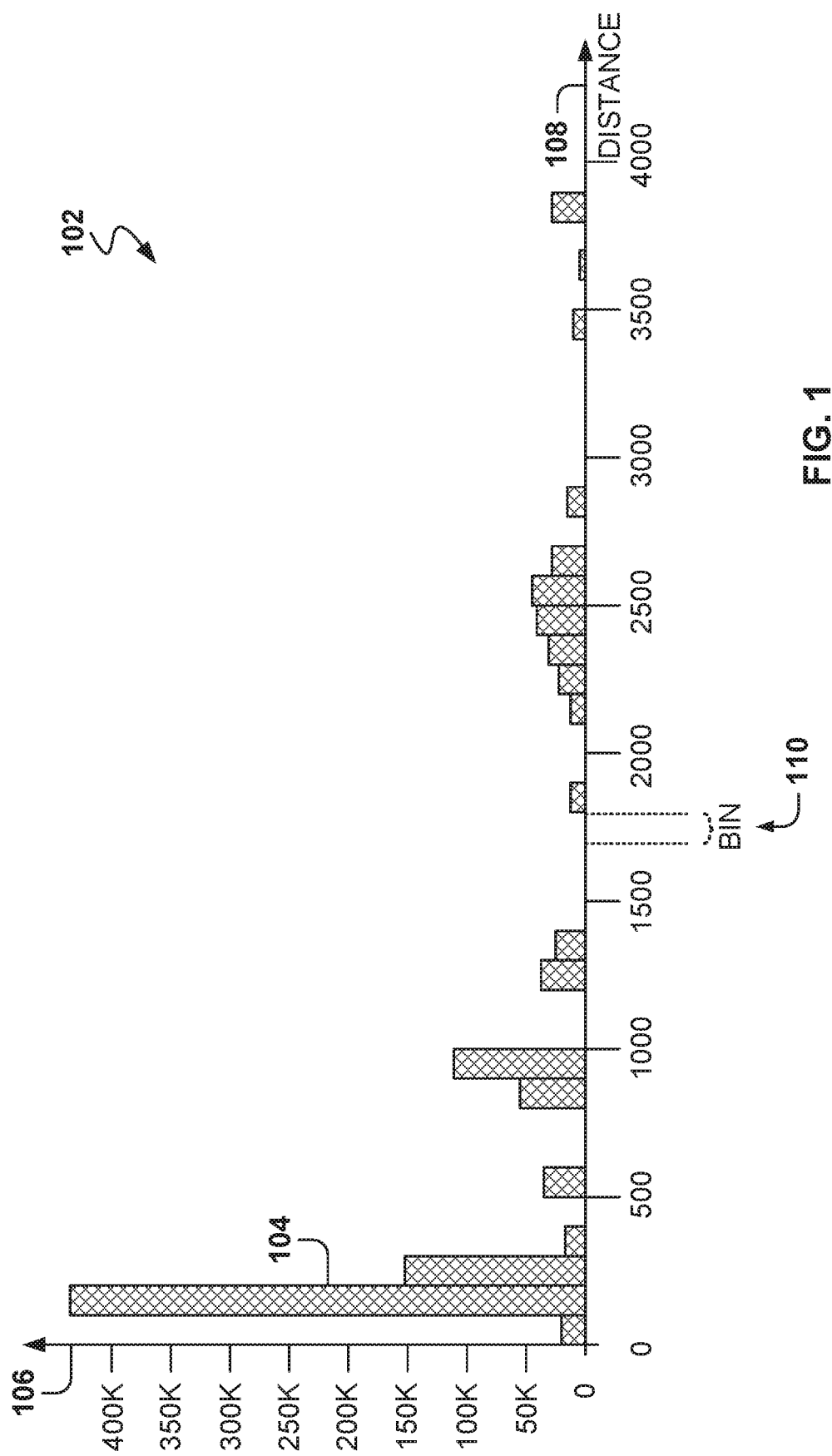
FIG. 1 is a histogram to graphically represent data from a database by groups, according to some example embodiments.

Example methods, systems, and computer programs are directed to obtaining histogram data from a database utilizing a database interface that includes options for getting the histogram data. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments presented herein provide for systems and interfaces for accessing a database to easily create histograms. In order to generate data for histogram, some databases require that the user makes several database-access operations to obtain the data. With large databases, creating the histogram data may utilize a large amount of computing resources because the database may have to calculate the maximum and the minimum values of the data, as well as perform counting operations for each of the bins in the histogram. Calculating the maximum and minimum values of data, for example, may require traversing all the values of a certain variable in order to find the maximum and the minimum. Further, calculating the values for a bin may require traversing the database values in order to identify with entries are within the bin and calculate the corresponding parameter, such as account of bodies within the bin.

Embodiments provide an interface for getting histogram data efficiently, such as by receiving a single request from the client in order to obtain the histogram data. Once the histogram data is calculated by the database server, the data for the histogram is returned in a single operation, such as by returning a table with values to generate the histogram chart.

A specific language for histogram queries is provided, which allows the user to specify options for generating the histogram data. The options may include specifying the number of bins, the offset (e.g., the offset of the first bin), and the width of the bins. This way, any new bins match the width and offset of previously calculated histograms. In addition, the client is able to specify the binning algorithm that the engine should use, such as, for example, a "nice binning" algorithm.

One general aspect includes a method including an operation for providing, by one or more processors, an application programming interface (API) to access a database, the API including a histogram request to obtain histogram data from the database, the histogram request having one or more histogram options for creating the histogram data. The method further includes an operation for receiving, by the one or more processors and from a client device, a first histogram request to obtain data for a first histogram. The first histogram request includes one or more first histogram options. The method also includes identifying, by the one or more processors, bins for the first histogram based on the one or more first histogram options. For each bin, the one or more processors access the database to obtain data for each bin. The method further includes an operation for returning, to the client device, the histogram data for the first histogram as a table containing bin values for all the bins. The client device is configured to present the histogram to a user based on the histogram data.

FIG. 1 is a histogram 102 to graphically represent data from a database by groups, according to some example embodiments. A histogram is a graphical representation of a distribution of numerical data for a certain variable (e.g., distance). As used herein, this variable is referred to as "the independent variable," "the histogram variable," or simply "the variable." The data in the histogram 102 is grouped into bins 110, also referred to as buckets or intervals. Each bin 110 correlates, or aggregates, the data for a range of the variable (e.g., the distance between 100 and 199 miles). The complete range of the values of the variable is then broken into a plurality of bins 110, and then a count is taken of how many values of the variable fall into each bin 110. Thus, a bin 110 defines a range of consecutive values of the independent claim.

The bins 110 are usually specified as consecutive, non-overlapping intervals of a variable, but some histograms may include other types of bins. The bins 110 are often of equal size, but some histograms may include bins of different sizes.

In one example histogram, the variable is associated with the horizontal axis of the chart, and the vertical axis corresponds to an ordinal value corresponding to the count of values falling within each bin. In other histograms, the axis may be reversed.

A bar 104 is a rectangle erected over one bin. The bar 104 has a height that is proportional to the frequency (e.g., the number of values in the bin) and a width corresponding to the bin range. A histogram may also be normalized to display "relative" frequencies, showing the proportion of cases that fall into each of several categories, with the sum of the heights equaling 1.

Histograms give a rough sense of the density of the underlying distribution of the data. In the example of FIG. 1, the database includes data for delay times of flights within the United States. The x variable 108 is the distance of the flight and the y-axis 106 shows the count of flights with a delay within the corresponding bin 110. It is noted that some of the bins 110 may be empty because there are no values within the corresponding range of the bin 110. For example, the bin 110 for distances between 1700 and 1799 has no values so there is not a bar or rectangle above the bin 110.

Embodiments presented herein describe interfaces for "binning" data, that is, for creating statistical data (e.g., count of items with values within a certain range) that may be used for creating a graphical representation of the data. For example, binning may be used for creating a histogram based on a single variable, as described below in more detail, but the principles presented herein may be applied to any type of histograms or categorization charts. For example, histograms may be created for one variable or for multiple variables.

In general, bar graphs may be used for comparing data, such as by using grouped bar charts and stacked bar charts. For example, a comparison of flight delays for two different airlines may utilize a grouped bar chart with different colored bars to represent each airline. Further, a stacked bar chart may be used to represent different groups on top of each other. Additionally, the principles may be utilized for different graphical representations of the data besides histograms, such as pie charts, line charts, side-by-side charts, or any other chart or charts based on data categorization.

Figure 2:
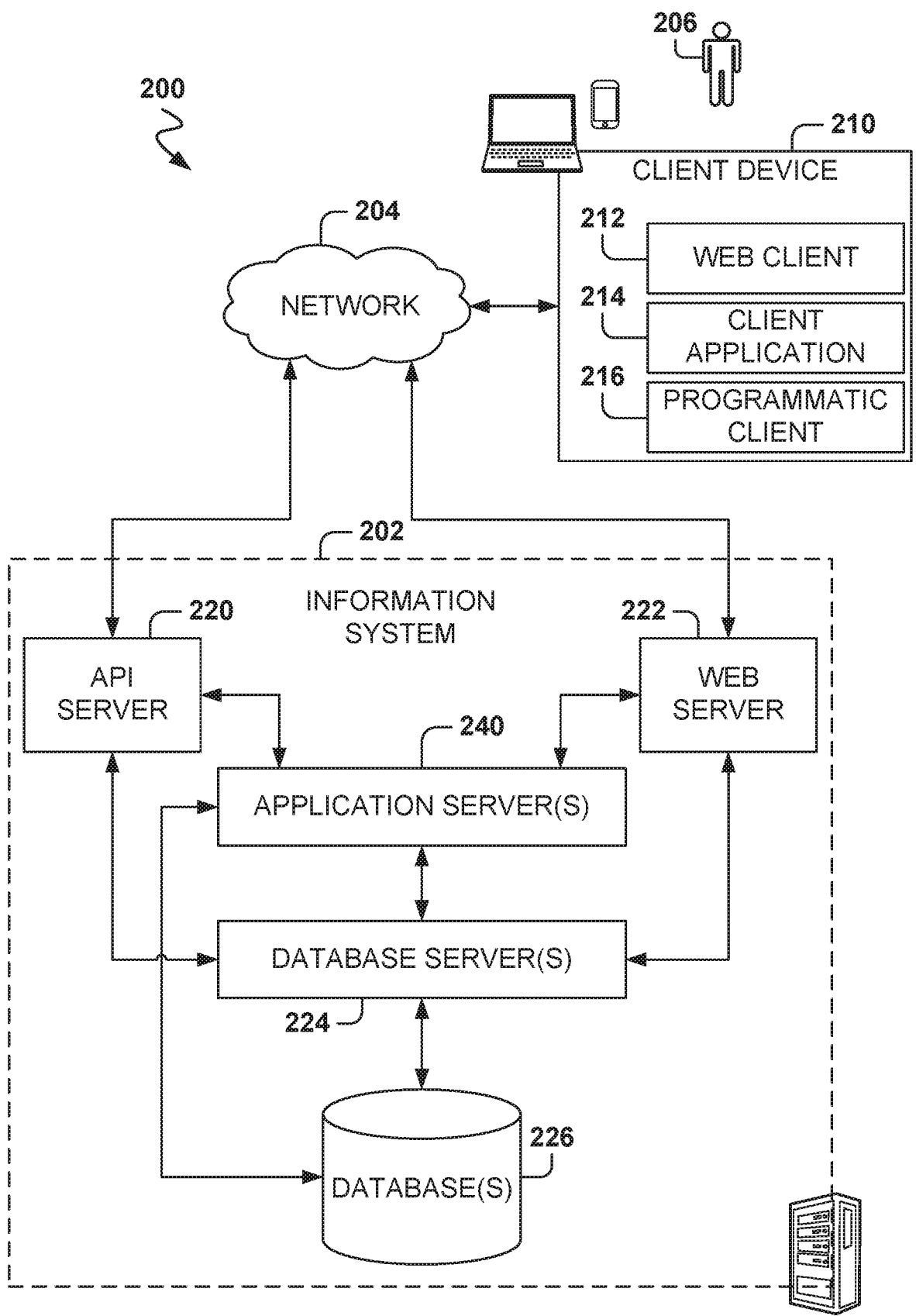
FIG. 2 is a block diagram illustrating a networked system, according to some example embodiments.

FIG. 2 is a block diagram illustrating a networked system, according to some example embodiments. An example embodiment of a high-level client-server-based network architecture 200 is shown. An information system 202 provides server-side functionality via a network 204 (e.g., the Internet or wide area network (WAN)) to one or more client devices 210. A web client 212 (e.g., a browser, such as the Internet Explorer® browser developed by Microsoft® Corporation of Redmond, Wash. State), a client application 214, and a programmatic client 216 execute on client device 210.

The client device 210 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the information system 202. In some embodiments, the client device 210 may comprise a display module (not shown) to display information (e.g., in the form of user interfaces).

The client device 210 may include one or more applications (also referred to as "apps") such as, but not limited to, a web browser, messaging application, electronic mail (email) application, an e-commerce site application (also referred to as a marketplace application), and the like. In some embodiments, if the application is included in a given client device 210, then the application is configured to locally provide the user interface and at least some of the functionalities with the application configured to communicate with the information system 202, on an as-needed basis, for data and/or processing capabilities not locally available (e.g., access to a database of items). Conversely, if the e-commerce site application is not included in the client device 210, the client device 210 may use its web browser to access services hosted on the information system 202.

In some example embodiments, the information system 202 includes an application program interface (API) server 220 and a web server 222 that provide programmatic and web interfaces respectively to one or more application servers 240. The application servers 240 may host one or more applications (e.g., to provide access to database servers 224 or to create histograms by interfacing with the database servers 224), each of which may comprise one or more modules or applications and each of which may be embodied as hardware, software, firmware, or any combination thereof. The application servers 240 are coupled to one or more database servers 224 that facilitate access to one or more information storage repositories or database(s) 226.

Further, while the client-server-based network architecture 200 shown in FIG. 2 employs a client-server architecture, the present inventive subject matter is of course not limited to such an architecture, and could equally well find application in a distributed, or peer-to-peer, architecture system, for example.

The web client 212 may access the various services of information system 202 via the web interface supported by the web server 222 or the programmatic interface provided by the API server 220. In addition, the web client 212, the client application 214, and the programmatic client 216 may access the information system to obtain data from the databases 226 to create histograms for presentation in the user interface of the client device 210.

Figure 3:
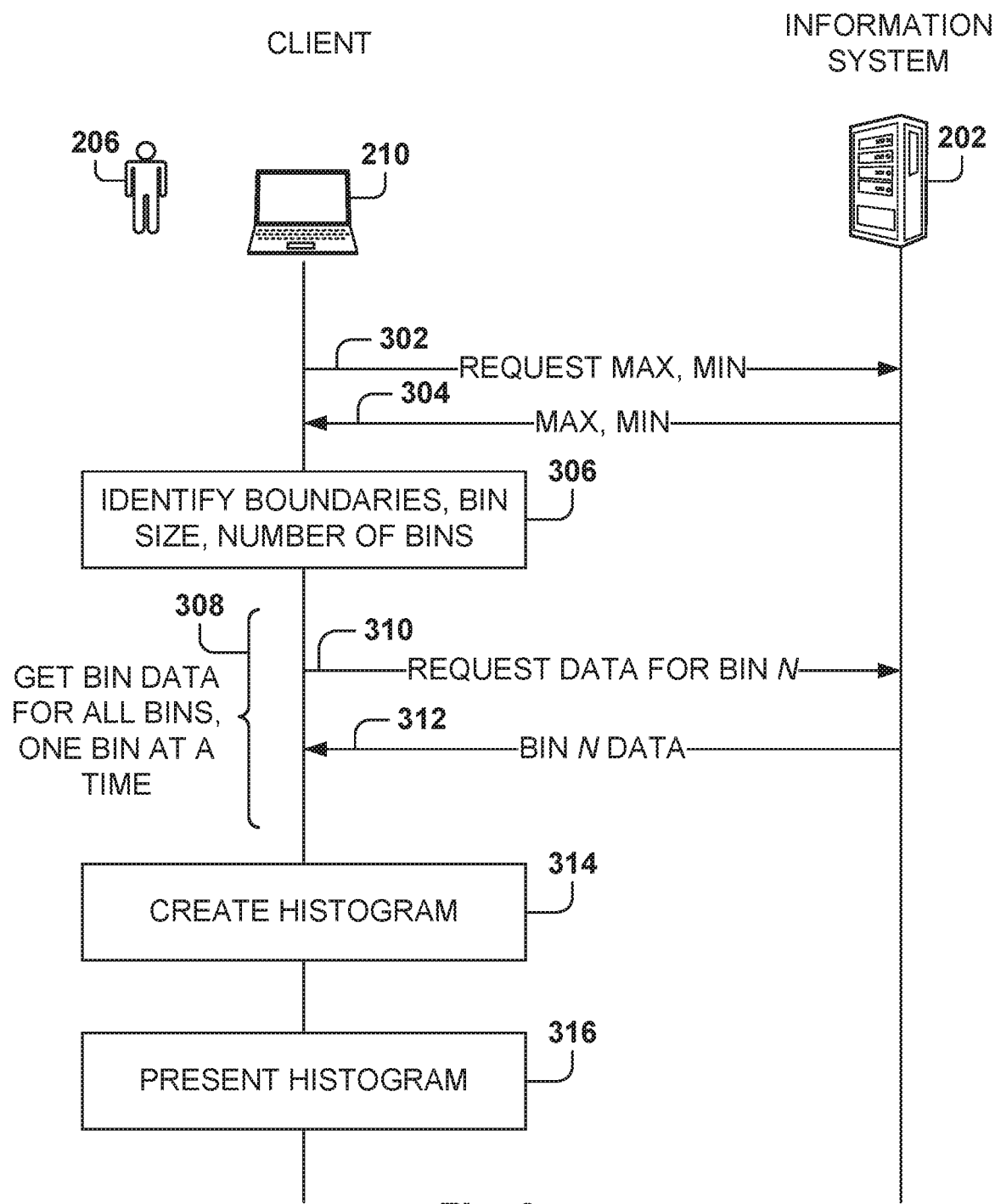
FIG. 3 is diagram representing interactions, between the client device and an information system, to present a histogram at the client device, according to some example embodiments.

FIG. 3 is diagram representing interactions, between the client device 210 and an information system 202, to present a histogram at the client device 210, according to some example embodiments. It is common for users 206 to request histograms to visualize data. Many visualization software programs can create the histograms and may run on the client device 210 or on the information system 202.

Some methods for creating the histogram follow a series of operations to gather the data for the histogram and to build the histogram for presentation on the client device 210, as illustrated in FIG. 3. The operations may include a request 302 sent from the client device 210 to the information system 202 requesting the maximum and minimum values of the independent variable.

The information system 202 returns the maximum and minimum values in operation 304. It is noted that in systems with large amounts of data, calculating the maximum and the minimum may be expensive operations because the database has to cycle through all the values to determine the highest and the lowest values.

The application in the client device 210 calculates the boundaries for the histogram, the bin size, and the number of bins based on the maximum and minimum values received. In one example embodiment, the bin size is calculated as the maximum minus the minimum divided by the number of bins desired, but other example embodiments may utilize different formulas, such as by rounding the bin size to an integer, or to a multiple of 5, or to a multiple of 10, or to a multiple of 100, etc. The use of such multiples enables the generation of a histogram that is conveniently viewable on a client device 210 display.

The data for each bin is obtained (operation 308) one bin at a time. Operation 308 includes a request 310 sent from the client device 210 to get the data for one bin (e.g., by providing the bin boundaries for the independent variable), and a response 312 sent by the information system 202 with the bin data (e.g., the count value for the bin).

For example, data for a certain variable is spread out between zero and 100. The database returns that the lowest value is 10 and the highest value is 90. If the user wants to have 10 bins, then each bin will have a size of nine, the first bin starting at 10 and the last bin ending at 90. Therefore, the bin boundaries will be 10, 19, 28, 37, etc.

It is noted that several queries have been sent to the database and information system 202, but the client has not informed the information system 202 of the intent to create a histogram. Therefore, it is not possible to implement optimizations at the database for getting histogram data by leveraging how data is accessed and cached. It is noted that in the presence of large databases, each data request may be expensive because the database has to cycle through all the values to get the count for the bin.

It is further noted that some applications may include an interface for creating histograms, but these tools in turn rely on multiple requests to the database. The application may hide the complexity from the user, but creating the histogram still involves several access requests to the database.

Figure 4:
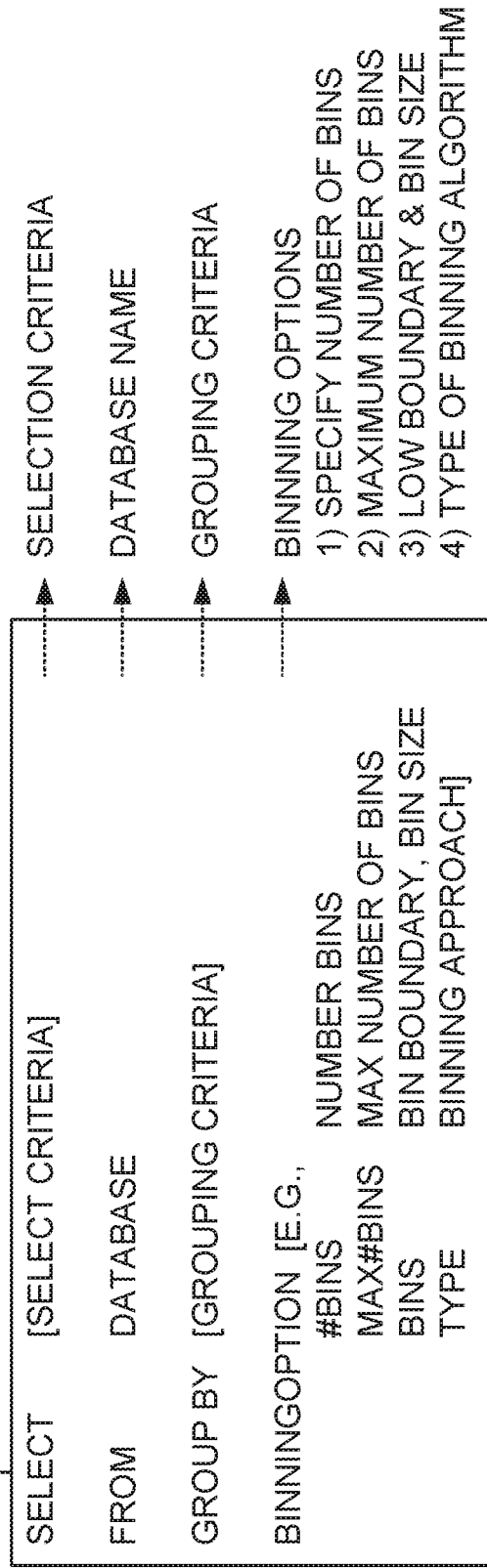
FIG. 4 shows the database interface for requesting histogram data, according to some example embodiments.

FIG. 4 shows a database interface for requesting histogram data, according to some example embodiments. Embodiments provide for a programmatic interface to request access to histogram data in a single request, while providing several options for how the histogram data is created.

Simply put, the request may be "give me the histogram data from this database, for one or more variables, according to specified bin options." The database then returns all the data needed to form the histogram (e.g., in tabular form or list form, but other types of formatting are also possible).

Users may use a single request to get the data needed from the database. Further, since the database knows that the request is for histogram data, the database might perform optimizations for getting the data, organizing the data, and storing information that will facilitate the creation of the histogram data. For example, the database may get all the buckets' data in a single pass through the data by parsing the data and updating the counters for each of the bins. In addition, the database may cache some of the information in order to make histogram data retrieval faster and more efficient (e.g., the database may keep track of the maximum and minimum values of the variable if the database is configured to provide histograms for that value frequently).

In some example embodiments, the data request 402 for histograms includes common database request parameters (e.g., SELECT, COUNT, FROM) and bin options, also referred to as histogram options or BINOPTIONS. In some example embodiments, the histogram request may be expressed as:

---
SELECT variable
GROUP BY [grouping options]
BINNINGOPTION [bin options]
---

A first bin option is for the number of bins for the histogram. If this value is provided, the database will determine the maximum and minimum values, and then determine a bin size that results in the desired number of bins. For example, the user may specify 20 as the number of bins, and the database will generate a histogram with 20 bins. It is noted that depending on the data (e.g., the maximum and minimum values), the bin size may change in order to generate the desired number of bins. Over time, if the maximum or minimum values change, then the same request for a histogram may produce different bin sizes in order to accommodate for the smaller or largest data ranges. In other example embodiments, the minimum value may be ignored and the variable range for the histogram starts at zero.

A second possible bin option is to specify the maximum number of bins. In this case, the system will determine a number of bins that is below the desired maximum or the desired maximum, but the system will aim at using a bin size that is easily understood. For example, if the maximum number of bins is 20, the database may select a histogram with 17 bins and a bin size of 10, instead of using 20 bins that would result in a bin size of 8.5. In general, it is easier to visualize data in intervals of 10 than in intervals of 8.5, and having 17 bins instead of 20 would not affect much, if any, of the visualization of the histogram.

In some embodiments, an algorithm referred to as "nice binning" is utilized to select the bin size and the number of bins. The nice binning algorithm selects bin sizes that are naturally understood for users, such as utilizing integer numbers for the bin size instead of bin sizes with decimal points, utilizing bin sizes that are multiples of 5 or 10 instead of bin sizes of 4 or 9, etc.

A third bin option, referred to herein as BINS, includes defining a bin boundary and a bin size. The bin boundary may be the lower boundary of the first bin (e.g., leftmost bin on the histogram), or the high boundary of the first bin, or the boundary for any other bin. For example, the bin boundary may be 10, but if there are values below 10, then there may be other bins created, such as a bin from 0 to 10, a bin from −10 to 0, etc.

This third bin option is useful when comparing histograms obtained at different times or from different time periods. By specifying the boundary and the bin size, two histograms created with the same boundary and bin size may be easily compared, such as by placing them together one above the other on a user interface or on a printed page in order to facilitate making comparisons.

A fourth bin option, referred to as type, defines which bin options are included. A first parameter type, referred to as EQUAL_WIDTH_NAIVE, indicates that every bin has the same width, which is provided through the API request. An example of BINOPTIONS with EQUAL_WIDTH_NAIVE is as follows:

{"NumBins":10, "Type":EQUAL_WIDTH_NAIVE}"

A second parameter type, referred to as EQUAL_WIDTH_NICE, indicates that every bin has the same width, which is determined by a "nice binning" algorithm. As discussed above, the "nice binning" algorithm chooses a bin size that is easy to understand, such as multiples of 5, 10, 100. In addition, a maximum number of bins may be specified via the parameter "NumBins". An example of BINOPTIONS with EQUAL_WIDTH_NICE is as follows:

{"NumBins":64, "Type":EQUAL_WIDTH_NICE}"

A third parameter type, referred to as OFFSET_WIDTH, indicates that every bin has the same width, which is provided through the API request. In addition, one boundary of the bin may also be provided through the API request. An example of BINOPTIONS with OFFSET_WIDTH is as follows:

{"Offset":100, "Width":100, "Type":OFFSET_WIDTH}"

One example histogram request 404 is for creating a histogram representing the average arrival delay of flights according to the distance of travel. In this case, the following query is entered:

| SELECT | AVG(ARRIVAL_DELAY), BINNED_DISTANCE |
| FROM | FAADATA |
| WHERE | Carrier = 'HA' |
| GROUP BY | BINNED_DISTANCE |
| BinningOption: | |
| | {VARIABLE: TRAVEL_DISTANCE, |
| | "NumBins":64, |
| | "Type":EQUAL_WIDTH_NICE} |
| | AS BINNED_DISTANCE |

This request creates a histogram for average delay times binned by travel distance, where the database FAADATA includes flight delay data, the carrier is Hawaiian Airlines (HA), and the histogram options include a histogram with 64 bins of equal size utilizing the nice binning algorithm.

A request for a multi-dimensional histogram may be expressed as:

```
SELECT variable1, variable 2 ...
GROUP BY [grouping options]
BINNINGOPTION [bin options for the multiple variables]
```

An example for a multi-dimensional histogram is:

| SELECT | COUNT(*), BIN_ARR_DELAY, BIN_DEP_DELAY |
| FROM | FAADATA |
| GROUP BY | BIN_ARR_DELAY, BIN_DEP_DELAY |
| BINNINGOPTION: | {Variable: ARRIVAL_DELAY, |
| | "NumBins":64, |
| | "Type":EQUAL_WIDTH_NICE}" |
| | AS BIN_ARR_DELAY |
| | {Variable" DEPARTURE_DELAY, |
| | "NumBins":32, |
| | "Type":EQUAL_WIDTH_NAIVE} " AS |
| BIN_DEP_DELAY | |

In this multi-dimensional histogram, the data is binned for two variables: arrival delay and departure delay. It is noted that in this case, the data is not binned according to the distance, instead being binned according to the respective delay.

In another example, the histogram request is for bins of size 100 and boundaries at 100 or a multiple thereof. After this histogram is created, the user may enter the following request later (e.g., the following year) to request a histogram, but using the same bin sizes and bin boundaries:

| SELECT | AVG(ARRIVAL DELAY), BINNED_DISTANCE |
| FROM | FAADATA |
| WHERE | Carrier = 'HA' |
| GROUP BY | BINNED_DISTANCE |
| BinningOption: | {VARIABLE: TRAVEL_DISTANCE, |
| | "Offset":100, |
| | "Width":100, |
| | "Type":OFFSET_WIDTH} AS |
| BINNED_DISTANCE | |

In this case, the bin boundary is provided (Offset) as well as the bin width (100). The type OFFSET_WIDTH indicates that the bin boundary and the bin size are specified parameters.

In yet another example, a user wishes to see a pair of histograms for the distribution of arrival delays of 2015 vs 2016. In one example embodiment, the user wants to share the bins, and the query for this histogram would be as follows:

| SELECT | COUNT(*), BINNED_DELAY, BINNED_YEAR |
| FROM | FAADATA |
| WHERE | YEAR IN (2015, 2016) |
| GROUP BY | BINNED_DELAY, BINNED_YEAR |
| BinningOption: | |
| | {VARIABLE: ARRIVAL_DELAY, |
| | "NumBins":64, |
| | "Type":EQUAL_WIDTH_NICE}AS |
| BINNED_DEL_YEAR | |
| | {VARIABLE: YEAR, |
| | "NumBins":64, |
| | "Type":EQUAL_WIDTH_NICE} |
| | AS BINNED_DELAY |

It is noted that the embodiments illustrated in FIG. 4 are examples and do not describe every possible embodiment. Other embodiments may utilize different histogram options, additional options, utilize one or several options at a time, etc. The embodiments illustrated in FIG. 4 should therefore not be interpreted to be exclusive or limiting, but rather illustrative.

Figure 5:
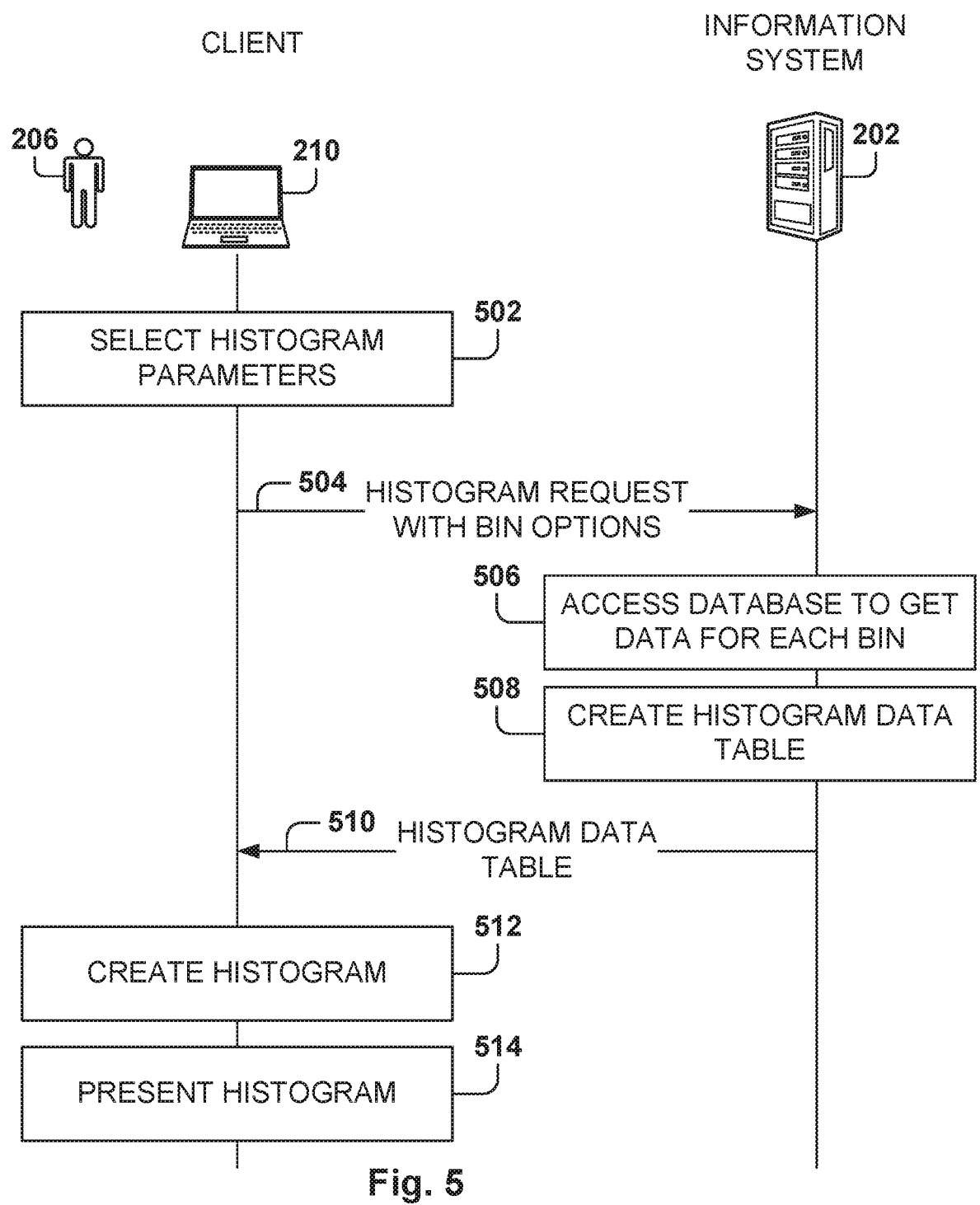
FIG. 5 illustrates how to get datagram data to the client device by issuing a single query, according to some example embodiments.

FIG. 5 illustrates how to get datagram data to the client device 210 by issuing a single query, according to some example embodiments. Some databases keep internal "statistics" to generate histograms. However, these histogram requests cannot be conditioned, e.g., "get histogram salary data for employees that have been with the company more than three years." By providing options for obtaining histogram data, the database system may utilize optimizing algorithms for creating histogram data, thereby reducing the cost of executing the slow and expensive multi-request approach.

When utilizing the single-query approach, the user 206, or the application executing on the client device 210, selects (operation 502) the histogram parameters (e.g., bin size, number of bins). The histogram request 404 is sent (operation 504) to the information system 202 with the desired bin options.

The information system 202 accesses the database (operation 506) to get data for all the bins in the histogram. For example, the information system 202 may calculate the maximum and minimum values for the independent variable, and then determine the bins for the histogram. The bins may be calculated based on the bin options received in the request, such as by basing the bins on a given boundary and bin size, or if a bin size is not provided, based on the data range and the number of bins desired. In addition, the information system 202 accesses the database to get the data for each of the bins (e.g., a count of the values within the given bin range). The information system 202 may perform several passes through the data to calculate each of the bin values, or it may perform a single pass through the data by counting the values for all the bins as the data is traversed (e.g., incrementing respective counters associated with each of the bins).

At operation 508, the information system 202 creates histogram data, such as a histogram data table described below with reference to FIG. 6. At operation 510, the histogram data table is sent to the client device 210, and the histogram data table is all the client device 210 needs to create the histogram at operation 512, without having to send additional requests for database data. At operation 514, the histogram is presented in the user interface of the client device 210.

FIG. 6 is a histogram data table, according to some example embodiments. As discussed above, with the single-query approach, all the data needed to make the histogram is returned as a single logical unit. Of course, if the amount of data is very large, the data may be fragmented for transmission (e.g., according to the network packet size, or some other limitation).

In some example embodiments, the histogram data table includes three fields: the bin number, the bin boundary (e.g., the low boundary or the high boundary), and the count value for the bin bar. In the example illustrated in FIG. 6, the bodies for the first 22 bins are provided. Some of the count numbers are zero, which means that there is no data in those bins, as illustrated in FIG. 1. In some example embodiments, the bin number is omitted because it is considered implicit based on the order of the data rows.

Other embodiments may utilize different formats for sending the data, such as utilizing any type of structured language to specify the bin values, or other parameters. For example, a list of value pairs may be sent as the histogram data. In some embodiments, the bin size may also be returned as well as the low boundary. In some embodiments, only the bins with data (e.g., count different from 0) may be transmitted, while bins with a count of 0 are not transmitted back to the client.

Figure 7:
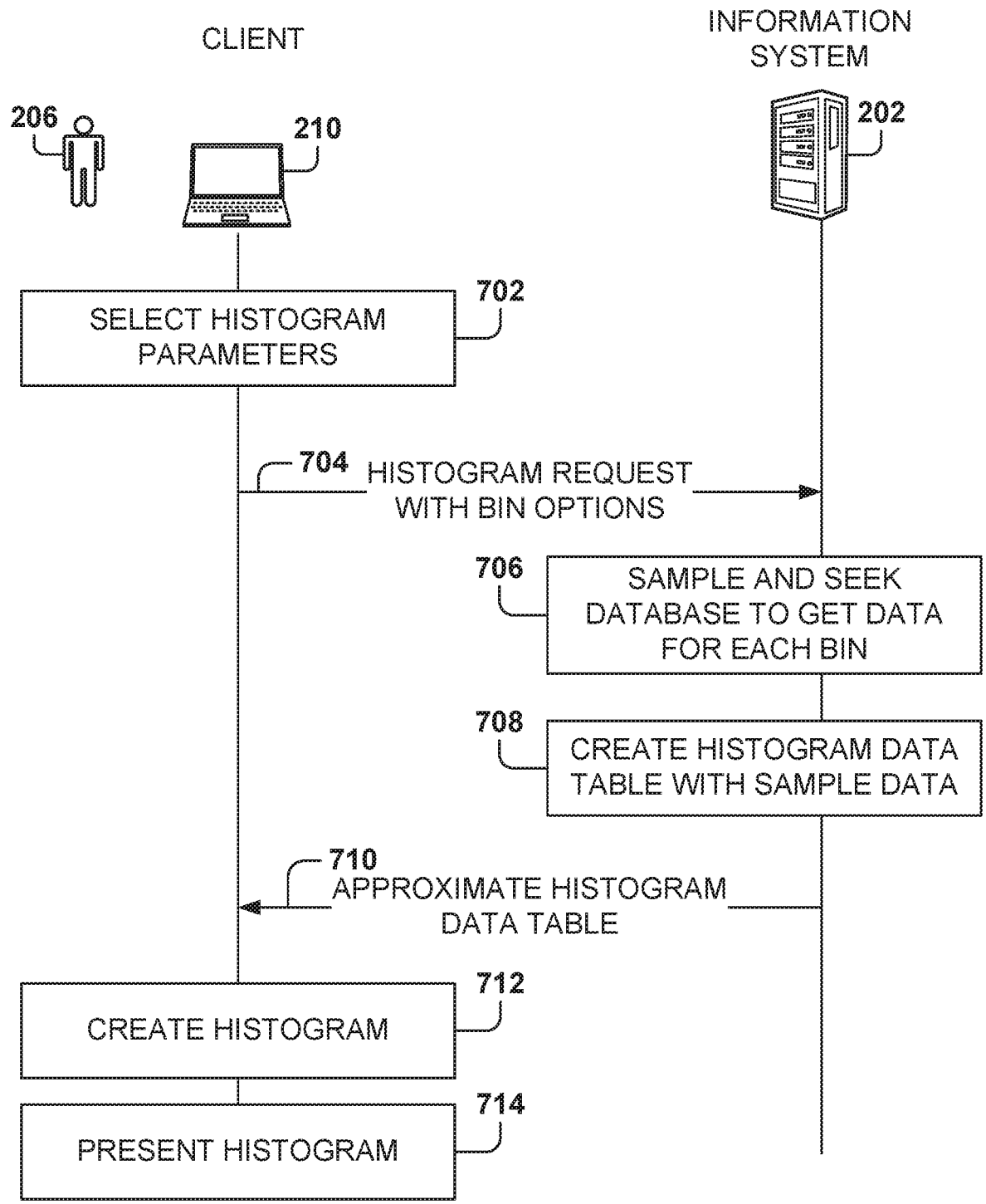
FIG. 7 illustrates how to get data for an approximate histogram, according to some example embodiments.

FIG. 7 illustrates how to get data for an approximate histogram, according to some example embodiments. In general, users like to get results quickly. When accessing large amounts of data from a database, it may take a long time to return the desired data to the user, especially when creating histograms which may require several access operations to the database.

Some databases provide an option to get quick data for the user; the quick data is an approximation and not based on the exact data of values, although the approximate data is believed to be substantially close to the exact data. As used herein, a histogram that is created with approximate data is referred to as an approximate histogram, as opposed to an exact histogram that utilizes the exact data values.

In some example embodiments, the histogram interface allows for an option to get quick approximate data in order to show a quick histogram. Afterwards, if desired, the system may continue in the background to access the database in order to obtain the exact data, but at least, the user is presented quickly with a histogram while the user waits for the exact data, if necessary.

FIG. 7 illustrates the operations for creating an approximate histogram utilizing a single histogram query to the database. At operation 702, the histogram parameters are selected, such as the maximum number of bins. At operation 704, the histogram request (e.g., histogram request 404) is sent to the information system 202 with the desired histogram request bin options, including an option that specifies that the histogram is an approximate histogram.

Upon receiving the request, the information system 202 identifies that the request is for an approximate histogram, so the information system 202 performs operations to get quick approximate data in order to return data quickly to the client device 210. In some example embodiments, at operation 706 the information system 202 utilizes a technique called "sample and seek." With sample and seek, the database utilizes sampling to obtain data and then extrapolating the sampled data to the whole range of values of the independent variable. This includes obtaining the bin data for each of the bins in the histogram.

At operation 708, the information system 202 creates the histogram data table based on the obtained sample data. At operation 710, the approximate histogram data table is sent to the client device 210. As described above with reference to FIG. 5, the client device 210 creates the histogram at operation 712, and presents the histogram in the user interface at operation 714.

It is noted that, in some example embodiments, the samples may be already loaded in memory and the server, and accessing the sample data may be done quickly. In some example embodiments, the information system 202 has to determine the maximum and minimum values of the data, but using the sample data, which may produce good results but not necessarily exact.

In some cases the approximate histogram is requested with the option specifying the maximum number of bins. It is good practice to show the user a similar histogram as the approximate histogram once the exact data is available. But since the maximum and minimum values may have changed, if the same calculation is performed to determine the bin size and the bin boundaries, the histograms may be different. This is where providing the bin boundary and the bin size in a second request for an exact histogram is useful, because the exact histogram will have the same format as the initial approximate histogram.

One general aspect includes a system comprising a memory including instructions and one or more computer processors. The instructions, when executed by the one or more computer processors, cause the one or more computer processors to perform operations that include providing an application programming interface (API) to access a database, the API including a histogram request to obtain histogram data from the database, the histogram request having one or more histogram options for creating the histogram data. The operations also include receiving, from a client device, a first histogram request to obtain data for a first histogram, the first histogram request including one or more first histogram options. The operations further include identifying bins for the first histogram based on the one or more first histogram options. For each bin, the database is accessed to obtain data for each bin. The operations also include returning, to the client device, the histogram data for the first histogram as a table containing bin values for all the bins. The client device is configured to present the histogram to a user based on the histogram data.

One general aspect includes a non-transitory machine-readable storage medium including instructions that, when executed by a machine, cause the machine to perform operations that include providing an application programming interface (API) to access a database, the API including a histogram request to obtain histogram data from the database, the histogram request having one or more histogram options for creating the histogram data. The operations also include receiving, from a client device, a first histogram request to obtain data for a first histogram, the first histogram request including one or more first histogram options. The operations further include identifying bins for the first histogram based on the one or more first histogram options. For each bin, the database is accessed to obtain data for each bin. The operations also include returning, to the client device, the histogram data for the first histogram as a table containing bin values for all the bins. The client device is configured to present the histogram to a user based on the histogram data.

Figure 8:
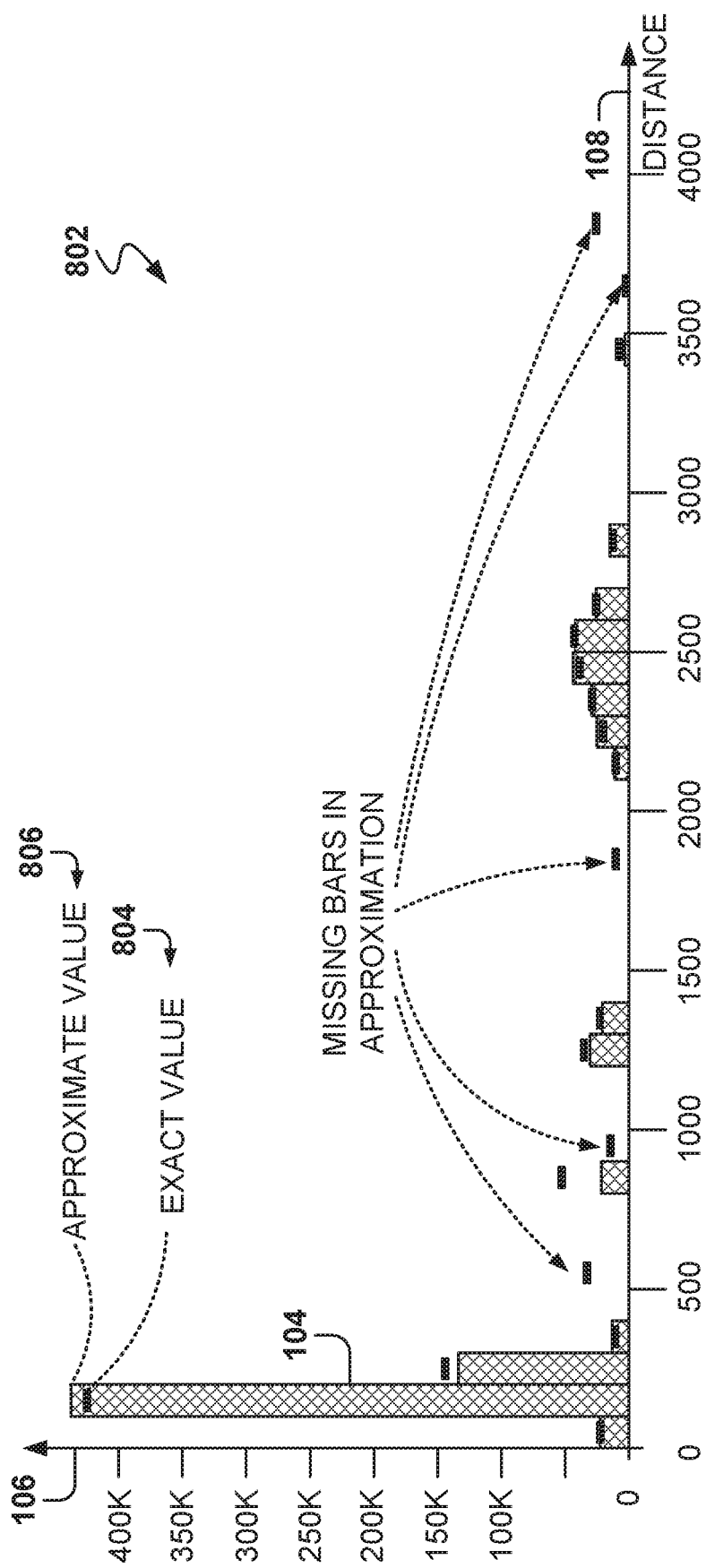
FIG. 8 shows an approximate histogram and a comparison with an exact histogram, according to some example embodiments.

FIG. 8 shows an approximate histogram and a comparison with an exact histogram, according to some example embodiments. Approximate histogram 802 shows bin values 806 based on the approximate data (as shown in FIG. 1). In order to show a comparison of the approximate and exact values, the exact values 804 have been added to the approximate histogram 802 as small black rectangles having a top side at the same height as the corresponding exact bin.

In this example, the approximate histogram 802 has some missing bins, that is, bins with a zero count in the approximate histogram and a value different from zero in the exact histogram of FIG. 1.

As indicated above, the comparison between the approximate histogram and the exact histogram is easy to make because of the options to provide the same bins and bin boundaries when calculating the exact histogram as in the approximate histogram. There may be some other mismatches, like a different minimum value or maximum value (not the case in FIG. 8), which would result in additional bins, but the bins would still be aligned by the same boundaries.

Figure 9:
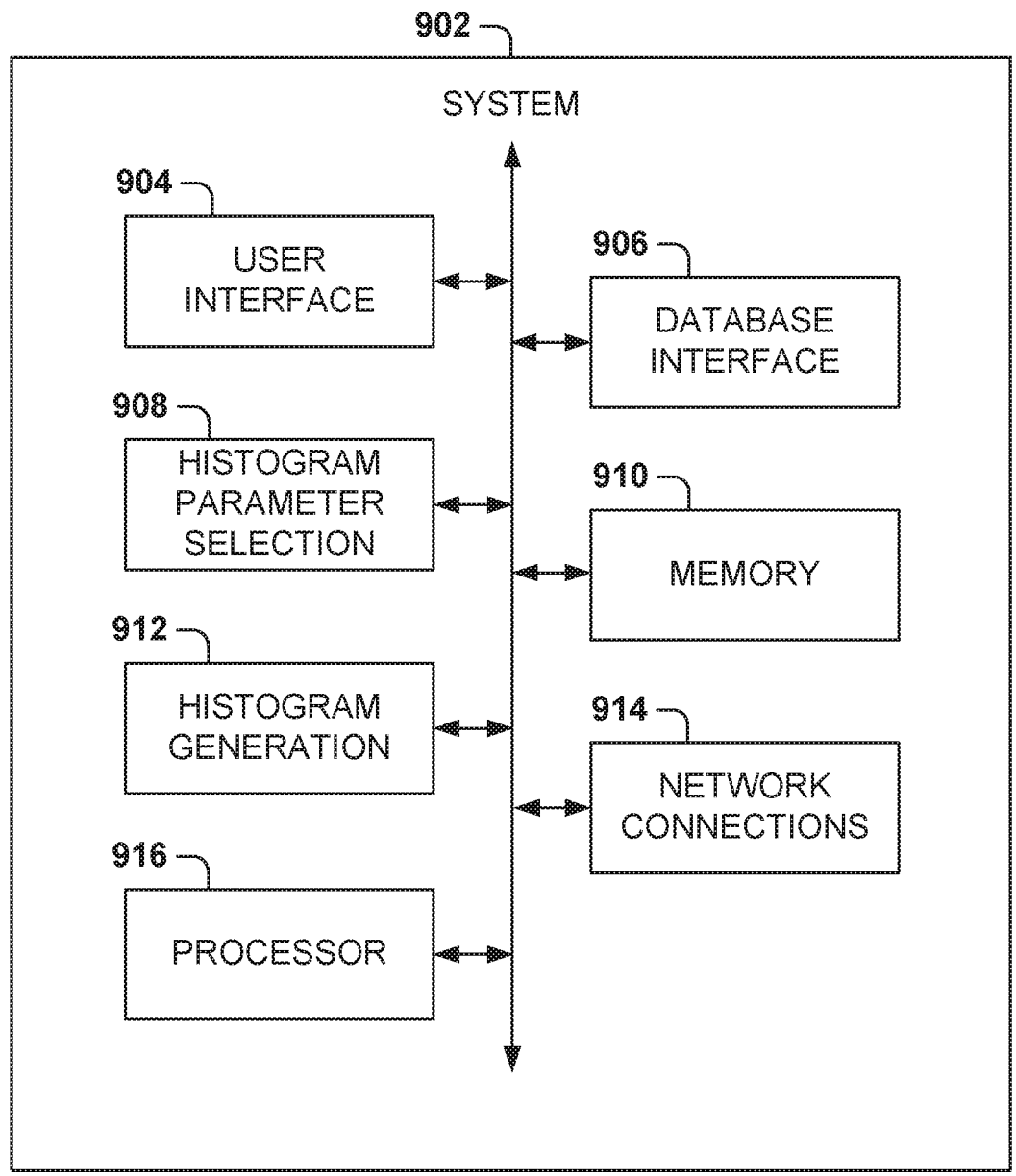
FIG. 9 illustrates a sample architecture for the system, according to some example embodiments.

FIG. 9 illustrates a sample architecture for the system 902 to create histograms, according to some example embodiments. As described above, the histogram may be created by an application executing on the client device 210, or the histogram may be created by an application executing on the server, where the application provides options for presentation of the histogram on a remote client (e.g., via a webpage that may be loaded by the client).

In some example embodiments, the system 902 includes a user interface 904, a database interface 906, a histogram parameter selection 908, a memory 910, histogram generation applications 912, one or more network connections 914, and one or more processors 916. In other example embodiments, the system 902 may include additional modules, may combine the functionality of several modules into a single program, or include fewer modules.

The user interface 904 program provides the functionality to present the user interface 904 to the user and includes an option to present the histogram. The user interface 904 may be presented on a display, printed on a hard copy, or exported into a file for viewing in another device.

The database interface 906 interacts with the database server in order to obtain data from the database. For example, the database interface 906 may send a single query to obtain the data for a histogram, and the histogram data may be processed by the histogram generation applications 912 to create a histogram for presentation at the user interface.

The histogram parameter selection 908 program manages the use of the different histogram options. For example, the histogram parameter selection 908 may calculate the bin size given the maximum and minimum values of data.

The memory 910 is used for storing histogram data and the program instructions of the programs executing on system 902 by processor 916. The network connections 914 provide network connectivity to the system 902.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 10:
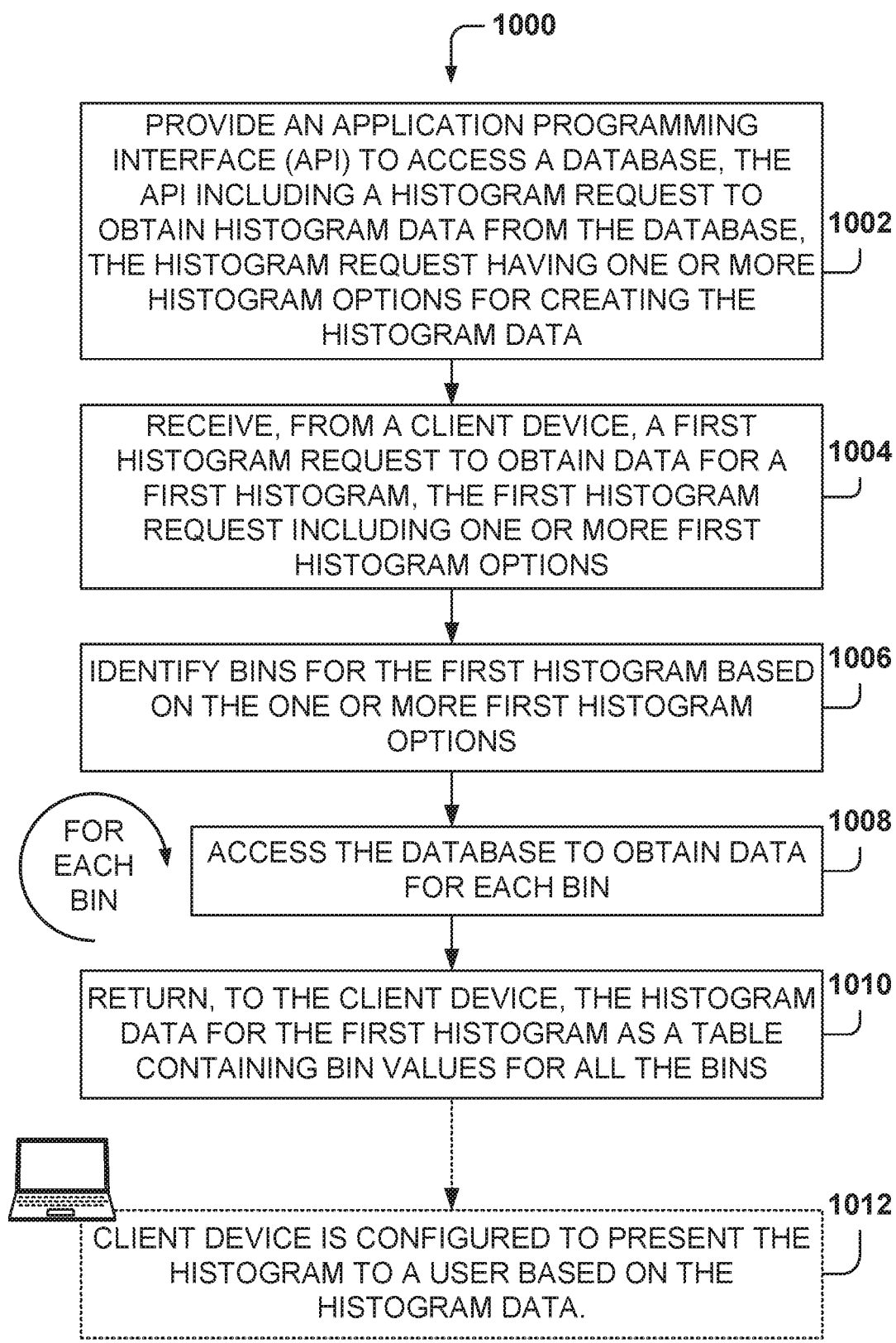
FIG. 10 is a flowchart of a method, according to some example embodiments, for obtaining histogram data from a database utilizing a database interface that includes options for getting the histogram data.

FIG. 10 is a flowchart of a method 1000, according to some example embodiments, for obtaining histogram data from a database utilizing a database interface that includes options for getting the histogram data. While the various operations in this flowchart are presented and described sequentially, one of ordinary skill will appreciate that some or all of the operations may be executed in a different order, be combined or omitted, or be executed in parallel.

At operation 1002, one or more processors provide an application programming interface (API) to access a database. In some example embodiments, the API is provided by a computing device and is configured for receiving data requests, such as the histogram request. The API includes a histogram request to obtain histogram data from the database, where the histogram request has one or more histogram options for creating the histogram data.

From operation 1002, the method 1000 flows to operation 1004, where the one or more processors receive, from a client device, a first histogram request to obtain data for a first histogram, the first histogram request including one or more first histogram options (e.g., maximum number of bins, bin boundary, bin size, etc.).

From operation 1004, method 1000 flows to operation 1006, where the one or more processors identify the bins for the first histogram based on the one or more first histogram options.

Operation 1008 is performed for each of the bins, where the one or more processors access the database to obtain the data for each bin. After the data for all the bins has been obtained, the method 1000 flows to operation 1010, where the one or more processors return, to the client device, the histogram data for the first histogram as a table containing bin values for all the bins. In operation 1012, the client device is configured to present the histogram to a user based on the histogram data.

In one example, the first histogram options include a first option to specify a number of bins for the histogram. In another example, the first histogram options include a second option to specify a maximum number of bins in the histogram.

In yet another example, the first histogram options include a third option to specify a boundary for a bin. In another example, the first histogram options include a fourth option to specify a size for all the bins.

In one example, the first histogram options include a fifth option to specify an identifier for an x field and a y field of the database, the x field corresponding to a horizontal axis of the histogram and the y field corresponding to a vertical axis of the histogram. In another example, the first histogram options include a sixth option to specify a type of histogram.

In another example, the histogram is an approximate histogram, and accessing the database further includes utilizing sample and seek to obtain data for the histogram data.

In one example, the table containing bin values includes fields for a bin number, a bin high boundary, and a count. In another example, the client device obtains the first histogram data by sending a single request.

Figure 11:
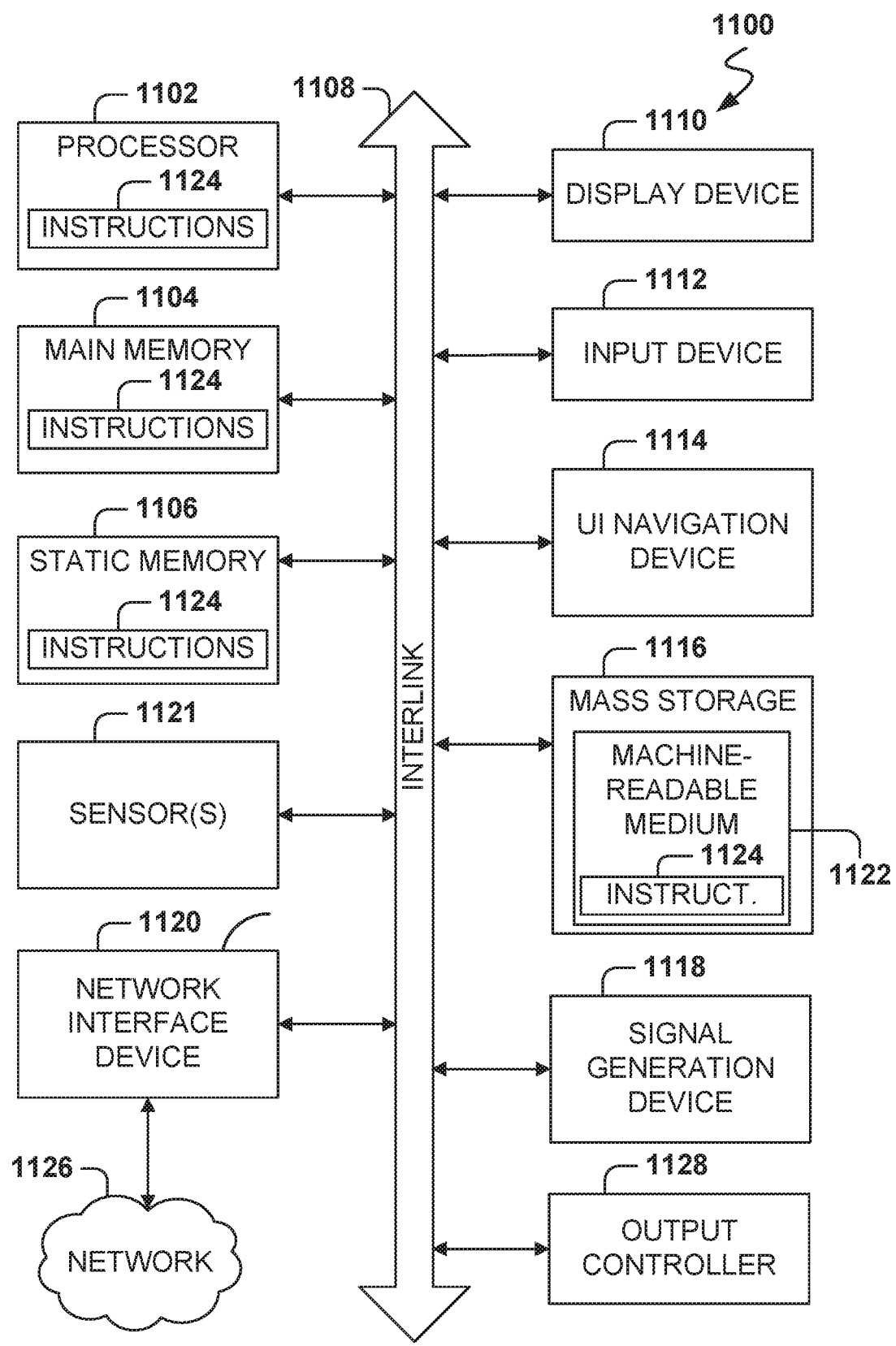
FIG. 11 is a block diagram illustrating an example of a machine upon which one or more example embodiments may be implemented.

FIG. 11 is a block diagram illustrating an example of a machine upon which one or more example embodiments may be implemented. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    providing, by one or more processors, an application programming interface (API) to access a database, the API including a histogram request to obtain histogram data from the database, the histogram request having one or more histogram options for creating the histogram data, the histogram options comprising a number of bins, a maximum number of bins, a low boundary, and a bin size;
    receiving, by the one or more processors and from a client device, a first histogram request to obtain data for a first histogram, the first histogram request including first histogram options comprising the number of bins for the first histogram and the bin size of the bins of the first histogram;
    calculating, by the one or more processors, bins for the first histogram based on the first histogram options, the calculating including creating the number of bins in the first histogram options where each bin has the size included in the first histogram options;
    for each bin from the calculated bins, executing one database search request to obtain a sample of the data associated with the first histogram to obtain approximate data for the first histogram data, each database search request comprising boundaries of the bin, each database search request returning a count of a number of elements for the bin;
    combining results from the database search requests to obtain the histogram data for the first histogram, the histogram data including the boundaries for each calculated bin and the count for each calculated bin; and
    returning, to the client device, the histogram data for the first histogram as a table containing boundaries and respective counts for all the calculated bins for generating a displayable histogram.

2. The method as recited in claim 1, wherein the first histogram options, received in the first histogram request, include a third option to specify a lower boundary for at least one bin.

3. The method as recited in claim 1, wherein the first histogram options, received in the first histogram request, include a fifth option to specify one or more variables for creating the first histogram.

4. The method as recited in claim 1, wherein the first histogram options, received in the first histogram request, include a sixth option to specify a type, the type being one of selecting equal width for the bins, selecting equal width for the bins with nice binning, or selecting a width and an offset for binning.

5. The method as recited in claim 1, wherein executing one database search request further includes:
    extrapolating the approximate data to obtain the first histogram data.

6. The method as recited in claim 1, wherein the table containing bin values includes fields for a bin number, a bin high boundary, and a count.

7. The method as recited in claim 1, wherein the client device obtains data for the first histogram by sending a single histogram request.

8. A system comprising:
    a memory comprising instructions; and
    one or more computer processors, wherein the instructions, when executed by the one or more computer processors, cause the one or more computer processors to perform operations comprising:

providing an application programming interface (API) to access a database, the API including a histogram request to obtain histogram data from the database, the histogram request having one or more histogram options for creating the histogram data, the histogram options comprising a number of bins, a maximum number of bins, a low boundary, and a bin size;

receiving, from a client device, a first histogram request to obtain data for a first histogram, the first histogram request including at least one of multiple first histogram options comprising the number of bins for the first histogram and the bin size of the bins of the first histogram;

calculating bins for the first histogram based on the first histogram options, the calculating including creating the number of bins in the first histogram options where each bin has the size included in the first histogram options;

for each bin from the calculated bins, executing one database search request to obtain a sample of the data associated with the first histogram to obtain approximate data for the first histogram data, each database search request comprising boundaries of the bin, each database search request returning a count of a number of elements for the bin;

combining results from the database search requests to obtain the histogram data for the first histogram, the histogram data including the boundaries for each calculated bin and the count for each calculated bin; and returning, to the client device, the histogram data for the first histogram as a table containing boundaries and respective counts for all the calculated bins for generating a displayable histogram.

9. The system as recited in claim 8, wherein the first histogram options, received in the first histogram request, include a third option to specify a boundary for a bin.

10. The system as recited in claim 8, wherein the first histogram options, received in the first histogram request, include a sixth option to specify a type, the type being one of selecting equal width for the bins, selecting equal width for the bins with nice binning, or selecting a width and an offset for binning.

11. The system as recited in claim 10, wherein executing one database search request further includes:
extrapolating the approximate data to obtain the first histogram data.

12. A non-transitory machine-readable storage medium including instructions that, when executed by a machine, cause the machine to perform operations comprising:

providing an application programming interface (API) to access a database, the API including a histogram request to obtain histogram data from the database, the histogram request having one or more histogram options for creating the histogram data, the histogram options comprising a number of bins, a maximum number of bins, a low boundary, and a bin size;

receiving, from a client device, a first histogram request to obtain data for a first histogram, the first histogram request including first histogram options comprising the number of bins for the first histogram and the bin size of the bins of the first histogram;

calculating bins for the first histogram based on the first histogram options, the calculating including creating the number of bins in the first histogram options where each bin has the size included in the first histogram options;

for each bin from the calculated bins, executing one database search request to obtain a sample of the data associated with the first histogram to obtain approximate data for the first histogram data, each database search request comprising boundaries of the bin, each database search request returning a count of a number of elements for the bin;

combining results from the database search requests to obtain the histogram data for the first histogram, the histogram data including the boundaries for each calculated bin and the count for each calculated bin; and returning, to the client device, the histogram data for the first histogram as a table containing boundaries and respective counts for all the calculated bins for generating a displayable histogram.

13. The machine-readable storage medium as recited in claim 12, wherein the first histogram options include a second option to specify a maximum number of bins in the first histogram.

14. The machine-readable storage medium as recited in claim 12, wherein the first histogram options, received in the first histogram request, include a third option to specify a boundary for a bin.

15. The machine-readable storage medium as recited in claim 12, wherein the first histogram options, received in the first histogram request, include a sixth option to specify a type, the type being one of selecting equal width for the bins, selecting equal width for the bins with nice binning, or selecting a width and an offset for binning.

16. The machine-readable storage medium as recited in claim 12, wherein executing one database search request further includes:
extrapolating the approximate data to obtain the first histogram data.

* * * * *